United States Patent [19]

Belva et al.

[11] 4,290,669
[45] Sep. 22, 1981

[54] OPTICAL DISPLAY APPARATUS

[75] Inventors: George M. Belva, Vestal; Richard A. Mecklenborg, Binghamton, both of N.Y.

[73] Assignee: The Singer Company, Binghamton, N.Y.

[21] Appl. No.: 107,299

[22] Filed: Dec. 26, 1979

[51] Int. Cl.³ .............................................. G02B 27/14
[52] U.S. Cl. ........................................ 350/174; 350/67
[58] Field of Search ................. 350/55, 174, 159, 179; 358/237, 60

[56] References Cited

U.S. PATENT DOCUMENTS

| | | | |
|---|---|---|---|
| 3,709,581 | 1/1973 | McGlasson | 350/174 |
| 3,761,157 | 9/1973 | Humphrey | 350/179 |
| 4,151,554 | 4/1979 | Tucker | 358/60 |

Primary Examiner—John K. Corbin
Assistant Examiner—B. W. de los Reyes
Attorney, Agent, or Firm—Douglas M. Clarkson; Jeff Rothenberg

[57] ABSTRACT

The disclosure describes an enclosed area (19) between a beamsplinter (11) and a curved reflective surface (12), two end surfaces (20) and (21) and a top membrane (22). The space (19) is hermetically tight and encloses a suitable dry gas, such as nitrogen. With a device constructed in this manner positioned adjacent a suitable television tube, such as CRT (17), the device will function as is well known, but cleaning and damage to optically coated surfaces is eliminated completely.

4 Claims, 5 Drawing Figures

OPTICAL DISPLAY APPARATUS

BACKGROUND

The invention relates to optical display systems for use with beamsplitter arrangements for dividing a light beam into two separate beams. More specifically, this invention relates to an improved means for dividing the rays of an image-bearing light beam into two separate beams without disturbance of the relation between the light rays.

The use of beamsplitter optical visual displays, particularly in simulators of aircraft as trainers and the like, is well known. Also well known are the many factors which make such simulators increasingly popular and in greater demand. It has been estimated that the value received from use of such simulators is directly proportional to the degree of realism that is achieved.

One of the primary areas where realism has been given the greatest attention with the corresponding increased results that have been achieved is in the area of improvements to the visual display systems. For example, a pilot in an aircraft simulator should have as wide a field of view in the simulator as he does in the actual aircraft.

To increase realism still further, in military types of aircraft where a pilot trainee is given weapons training at the same time as he is given flight instructions and must locate targets over a wide field of view, it is even more desirable to have an infinity image type of a display system to make the scene that is viewed even more realistic.

The type of display which gives the more realistic presentation is well known to be an infinity image display which utilizes a mirror-beamsplitter combination. Today's technology permits the design of a display having the desired field of view utilizing a single mirror-beamsplitter combination.

PRIOR ART

While U.S. Pat. No. 3,036,154 is not concerned directly with the same problems which the present invention solves, it does disclose a curved reflective surface and an inclined semireflector surface, in a compartment. The main objective with this structural arrangement is to produce an optical magnifier for a small television receiver.

U.S. Pat. No. 3,709,581 relates to a visual system more closely akin to that of the invention and is assigned to the same assignee as the present invention. While this patent discloses the use of an individual mirror-beamsplitter and Cathode Ray Tube (CRT) display, the patent relates to an improved system which reduces the number of displays that are required by increasing the field of view of each display.

All of the component parts in such mirror and beamsplitter combinations have surfaces that must be cleaned regularly, particularly the combinations which include a CRT. The electric field in a CRT causes a build-up of dust particles on the mirror, the beamsplitter and on other surfaces within proximity. This increases the need for cleaning, which increases the chance of damaging the surfaces and also a premature damage to the optical coatings.

Heretofore, the optical coatings had to be designed to withstand excessive cleaning, rubbing and other contacts before degradation of optical characteristics became apparent. Such optical parts, therefore, are costly, require more lead time and, yet, have a limited life in use.

INVENTION SUMMARY

It is an object of this invention to reduce substantially the cost of manufacturing a display system which utilizes a mirror-beamsplitter arrangement.

Another object is to provide an improved visual system utilizing an optical reflector visual display system with a longer life in use as any such systems known heretofore.

Still another object of the present invention is to provide a structure for an optical display system which overcomes the disadvantages of prior systems.

According to the invention, an optical reflector visual display system utilizes a beamsplitter means to divide an incident image-bearing light beam in a predetermined manner and a reflective surface forming a predetermined angle with the beamsplitter means. A suitable end surface forms a closure at opposite ends of this beamsplitter means and reflective surface combination, and by sealing all of the joints to form a fluid tight seal, the space thus formed can be filled with a suitable fluid in accordance with a particular environmental operating condition.

In this arrangement, the critical and more sensitive surfaces are the reflective surface and the side of the beamsplitter which faces the reflective surface. Both of these surfaces are on the inside of the space that is enclosed by the structure identified above, and therefore, these surfaces are completely unavailable to be contaminated by atmospheric or other operating environmental conditions or damage in any way by contact therwith during any cleaning operations, because cleaning of these coated surfaces is completely unnecessary.

Other objects and advantages as well as a complete understanding of the invention, may be obtained from the following detailed description when considered in connection with the accompanying drawings.

THE DRAWINGS

PREFERRED EMBODIMENTS

Figure 1:
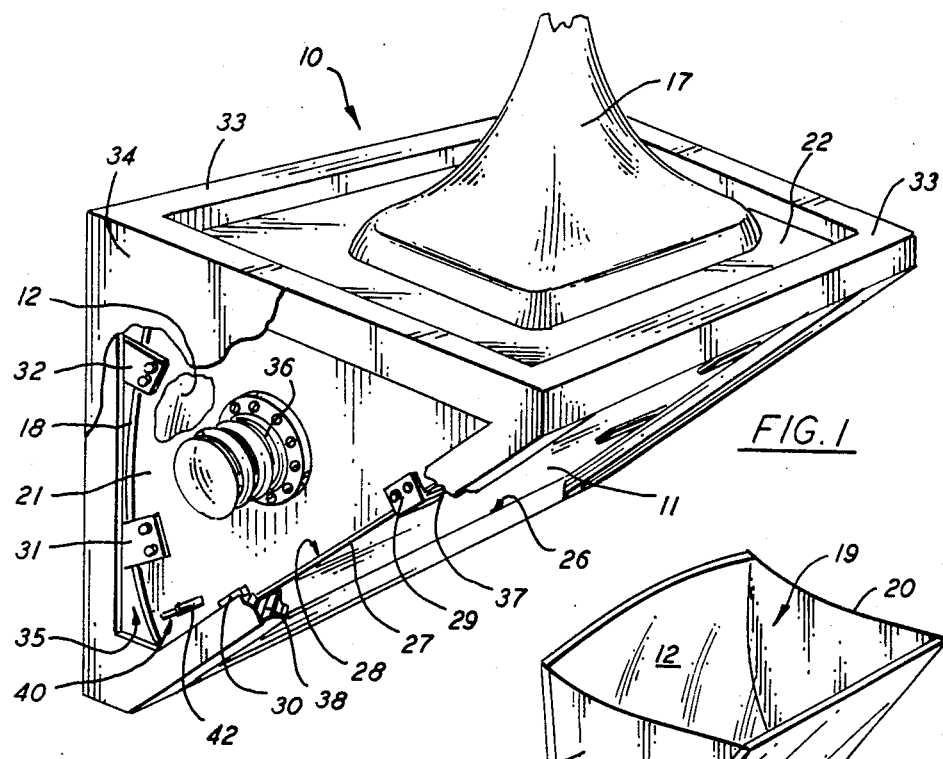
FIG. 1 is a view in perspective, partly in cross section, illustrating diagrammatically certain features of the invention.

The optical display system 10 shown in the drawings has beamsplitter means 11 and a reflective surface 12 as is well known in the art. The same reference numerals will be used throughout the various figures of the drawings to indicate the same or corresponding component parts.

The beamsplitter means 11 has an inner surface 13 which is treated to be partially reflective, so that when a beam 14 of image bearing light is incident on the inner surface 13 of the beamsplitter means 11, the beam 14 is partially reflected along a line indicated by the numeral 15, and part of the beam 14 passes straight through the beamsplitter means 11, as indicated by the line 16.

The particular angle of the beamsplitter means 11 relative to the incident light beam 14 is a matter of design consideration and where the reflected beams 15 and 16 are to be directed. Accordingly, further details on this point are deemed to be unnecessary here.

The material of which the beamsplitter means 11 is formed may be glass or plastic, but plastic may be preferred in many instances because of its resistance to chip and cracking. Plastic is much lighter in weight than glass, easier to work with and is less expensive also.

To overcome the brittleness of a glass product it usually must be annealed which is relatively slow process requiring a substantial amount of time. This means that the lead time or the time interval between the need for a glass product and the time when the glass product is available for use is substantially longer than for a comparable product made from plastic.

The reflective surface 12 customarily is in the shape of a segment of a spherical mirror. While the material of which the reflective surface 12 is formed may be glass, so long as the surface 12 provides the desired amount of reflectivity, this material is not critical, as a general rule.

Glass may be used in some instances, metal in others, but plastic may be the preferred material particularly where the beamsplitter means 11 is formed of plastic also. Therefore, the mirror segment 18 in the preferred form of the invention is formed of fiberglass.

Figure 2:
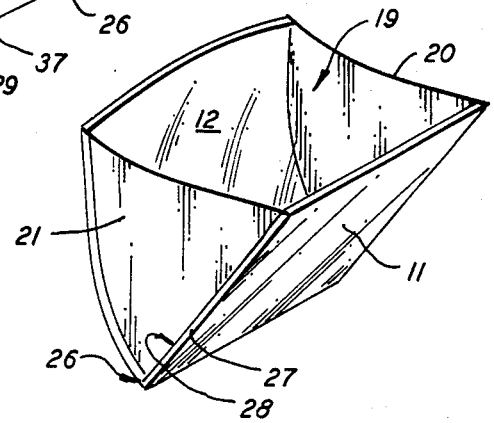
FIG. 2 is a view in perspective showing the space between the beamsplitter surface and a reflective surface in combination.

Of course, it will be recognized that a beamsplitter surface is old in the art, as is a beamsplitter surface spaced from a reflective surface, even a curved reflective surface, However, an arrangement in accordance with the present invention contemplates that the space 19, FIG. 2, that is enclosed between the beamsplitter means 11 and a curved reflective surface 12 is filled with dry nitrogen and is sealed hermetically from the atmosphere.

The space 19 is defined in one direction by the beamsplitter means 11, in the opposite direction by the reflective surface 12 and at opposite ends by end surfaces 20 and 21, respectively. Therefore, with the space 19 filled completely with a suitable dry gas, such as nitrogen, to be discussed in more detail presently, a top surface is essential in every instance.

Figure 3:
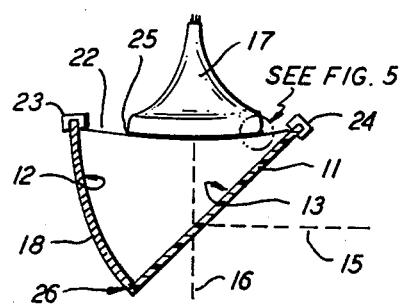
FIG. 3 is an end view of the beamsplitter-reflective surface combination showing one form of attachment of a cover over the space thereabove.

However, a top membrane 22 is stretched across the top opening, as viewed in the drawings, and is sealed by any suitable means around the edges, as by clamping bars 23 and 24, FIG. 2. Now, with the space 19 filled completely with dry nitrogen, the membrane 22 in place across the upper surface and suitably clamped by the clamping bars 23 and 24 to seal the space 19 hermetically, there only remains to position a suitable image bearing light beam above the membrane 22 as shown particularly in FIGS. 1 and 3 of the drawings.

A support for the CRT is not shown, because it is not a part of this invention and because many different supports are disclosed in the art, as well as being well known to those skilled in this art.

With the CRT 17 being in position as shown, it is contemplated that an appropriate contact fluid 25 is disposed between the CRT 17 and the flexible membrane 22 as a substantially continuous refractive medium in order to ensure a good, molecular, optical contact between the surfaces of the CRT 17 and the membrane 22. This contact fluid 25 provides an oil-like film between these surfaces, wetting both surfaces, eliminating light loss and Newton's rings, and is available commercially under the trade name "bromonapthelene" available from Cargil.

Any suitable material may be used for the flexible membrane 22, such as for example, Mylar or clear vinyl or polyethelene, each of which is approximately 0.007 inch thick. For the space 19 to be fluid tight, a suitable seal 26 must be provided between the beamsplitter means 11 and the reflective surface 12 at the bottom, as viewed particularly in FIGS. 2 and 3.

One edge 27 of the beamsplitter means 11 is visible in FIGS. 1 and 2. This edge 27 of the beamsplitter means 11 then is sealed hermetically along a line 28, also visible in these FIGS. 1 and 2. The weight of the fluid filling the space 19 must be considered when calculating the thickness of the end surfaces 20 and 21.

Since a structure, in accordance with the principles of the present invention, is not limited to the size of the particular beamsplitter means 11, in some instances where the volume of the space 19 is relatively large, the seal 28 may need some form of assistance to be maintained. In this case, suitable clamps, such as indicated by the numerals 29, 30, 31 and 32, in FIG. 1, are provided.

While any suitable gasket material may be utilized, it is presently contemplated that an effective gasket material is in the form of a closed cell rubber gasket material. With the gasket material in place, the clamps 29, 30, 31 and 32 are affixed by any suitable means, such as by an epoxy resin adhesive or even threaded bolts, if the material of which the end surfaces 20 and 21 will permit.

The beamsplitter means 11 should be drawn tightly against the edges of the end surfaces 20 and 21 before the clamps 29, 30, 31 and 32 are affixed. While any suitable fluid may be used to fill the space 19, it is contemplated that it should be a clear, non-volitile, with very low index of refraction.

It is the mechanical considerations that dictate many aspects of a particular installation, such as, for example, the thickness of the end surfaces 20 and 21, the volume of the space 19, etc. Likewise, whenever such mechanical considerations require it, a frame 33 is provided within the scope of the present invention to further secure the component parts.

Such a frame 33, made from illuminium bars, would be of sufficient rigidity to provide the support usually needed, and it is contemplated that each of the joints between various bar members would be welded and the entire frame 33 painted. The end surfaces 20 and 21, then, may be covered by a suitable cover 34, FIG. 1, and a back surface provided also, identified by the numeral 35 in FIG. 1.

When the volume of the space 19 would indicate it, a suitable reservoir must be provided for expansion and contraction of the gas contained within the space 19. Such is contemplated by the present invention as by a bellows 36, FIG. 1.

The calculations to indicate the volume of the particular gas that will be needed in the space 19 for a particular temperature range in a particular installation may be preformed readily by one skilled in this art, and such bellows are contemplated by the invention to be of the stainless steel type with a welded diaphragm, as is readily available commercially.

As best seen in FIG. 1 of the drawings, part of the frame 33 is cut away revealing the frame ends 37 and 38 to show better the end 27 of the beamsplitter means 11 and to show the bracket 29 and to explain further the seal necessary along the line 28.

Figure 4:
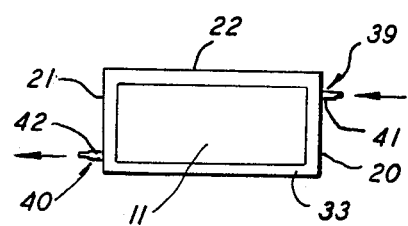
FIG. 4 is a front view of a modified form of the display system of the invention.
Figure 5:
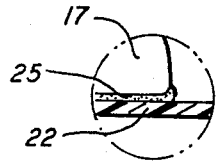
FIG. 5 is an enlarged view of a portion of the FIG. 3.

As better seen in FIG. 4 of the drawings, as inlet 39 is shown positioned high up on the end surface 20, and an outlet 40 is shown near the bottom of the end surface 21. An outlet 40 may not be required in every installation, particularly if one is provided on the bellows 36, or if the bellows can be loosened readily at its base and tightened again.

The inlet 39 is shown with an elongated neck 41, and the outlet 40 has an elongated neck 42 so that they will extend through the side surfaces 34, if such side surfaces are provided, or at least far enough to extend past the surface of the frame 33. Then, each of the inlet 39 and the outlet 40 is narrowed down so that after using, they may be pinched off to seal the unit better and more effectively.

As illustrated in FIG. 4 also, a gas is essential to fill the space 19. An appropriate gas is known commercially as "dry nitrogen", which will not react with the surfaces (is relatively inert), and it is essential that the gas be dust-free and be relatively inexpensive.

It has been found further that when filling the space 19 with a gas, such as dry nitrogen, it is better to extend the period of time of filling, so that when the gas is flowing in through the inlet 39, it will flow out through the outlet 40 for an extended period of time to be sure that the space 19 is purged adequately of all contaminates. Whereupon the outlet 40 is pinched off and sealed, while the gas continues in through the inlet 39 until the space 19 achieves a desired pressure which need not be but slightly more than atmosphere. Whereupon, the inlet 39 is pinched off and sealed.

While other modifications will occur to one skilled in this art, the embodiments described in detail herein are considered only as illustrative and not as restrictive, the scope and true spirit of the invention being defined by the appended claims.

What is claimed is:

1. An optical reflector visual display system comprising:
   beamsplitter means to divide an incident image-bearing light beam in a predetermined manner,
   a reflective surface forming a predetermined angle with said beamsplitter means,
   means to form a gas-tight seal between said beamsplitter means and said reflective surface,
   end surface means forming closures at the ends of said beamsplitter means and reflective surface to define a space,
   top surface means forming a closure across the remaining opening of said beamsplitter means, said reflective surface and said end surface means,
   said top surface means being in the form of a relatively thin membrane which is effective to close the remaining opening and seal it hermetically,
   said means to form a gas-tight seal between said beamsplitter means and said reflective surface extends also around all joints between said end surface means and said top surface means,
   gas means substantially filling said space formed by said beamsplitter means, reflective surface and end surface means so that the reflective surfaces of both said beamsplitter means and said reflective surface are covered by said gas means,
   flexible expansion chamber means connected to the space defined by said beamsplitter means and the various surface means to allow for expansion and contraction of said gas means;
   CRT means positioned with its image-bearing surface adjacent the top surface means,
   contact fluid means between said image-bearing surface and said top surface means to form a substantially continuous refractive medium as a molecular, optical contact between the surface of said CRT means and said top surface means,
   said means to form a gas-tight seal including both gasket means and clamping means to draw the surfaces tightly together,
   metallic frame means about said beamsplitter means, said reflective surface, said end surface means and said top surface means to form a rigid support structure.
   separate end closure means over said frame means to cover both ends separate from said end surface means,
   rear surface means separate from said reflective surface to cover the space behind said frame means so that said frame means is substantially enclosed separately.

2. An optical reflector visual display system as set forth in claim 1 wherein said reflective surface is in the form of a segment of a spherical mirror.

3. An optical reflector visual display system as set forth in claim 1 wherein said gas means is dry nitrogen which is substantially dust-free.

4. An optical reflector visual display system as set forth in claim 1 including inlet means and outlet means communicating with said gas-filled space so that said gas may be flowing for a predetermined period of time to purge said space of substantially all contaminants before said space is sealed.

* * * * *